US008239635B2

(12) United States Patent
Lev et al.

(10) Patent No.: US 8,239,635 B2
(45) Date of Patent: Aug. 7, 2012

(54) SYSTEM AND METHOD FOR PERFORMING VISIBLE AND SEMI-VISIBLE READ OPERATIONS IN A SOFTWARE TRANSACTIONAL MEMORY

(75) Inventors: Yosef Lev, Cambridge, MA (US); Daniel S. Nussbaum, Cambridge, MA (US); Mark S. Moir, Windham, NH (US)

(73) Assignee: Oracle America, Inc., Redwood City, CA (US)

( * ) Notice: Subject to any disclaimer, the term of this patent is extended or adjusted under 35 U.S.C. 154(b) by 315 days.

(21) Appl. No.: 12/570,591

(22) Filed: Sep. 30, 2009

(65) Prior Publication Data

US 2011/0078385 A1 Mar. 31, 2011

(51) Int. Cl.
 *G06F 12/00* (2006.01)
(52) U.S. Cl. .................................... 711/147; 711/163
(58) Field of Classification Search .............. 711/147, 711/163
 See application file for complete search history.

(56) References Cited

U.S. PATENT DOCUMENTS

| | | | | |
|---|---|---|---|---|
| 5,388,222 A | * | 2/1995 | Chisvin et al. ............... | 711/154 |
| 2007/0028056 A1 | | 2/2007 | Harris | |
| 2007/0288902 A1 | * | 12/2007 | Lev et al. ..................... | 717/124 |
| 2008/0163220 A1 | | 7/2008 | Wang et al. | |
| 2008/0270745 A1 | | 10/2008 | Saha et al. | |
| 2008/0301378 A1 | | 12/2008 | Carrie | |
| 2009/0089520 A1 | * | 4/2009 | Saha et al. .................... | 711/160 |
| 2009/0125548 A1 | * | 5/2009 | Moir et al. ................ | 707/103 R |
| 2009/0172317 A1 | * | 7/2009 | Saha et al. .................... | 711/159 |

OTHER PUBLICATIONS

Dave Dice, Nir Shavit, "TLRW: Return of the Read-Write Lock," TRANSACT 2009: The 4th ACM SIGPLAN Workshop on Transactional Computing, Feb. 7, 2009.
Spear, et al., "Privatization Techniques for Software Transactional Memory," University of Rochester Dept. of Computer Science, Technical Report #915, Feb. 2007, http://www.cs.rochester.edu/u/scott/papers/2007_TR915.pdf, Feb. 2007.
Virendra J. Marathe, et al., "Scalable Techniques for Transparent Privatization in Software Transactional Memory," ICPP 2008, Sep. 9, 2008.

(Continued)

*Primary Examiner* — Hashem Farrokh
(74) *Attorney, Agent, or Firm* — Robert C. Kowert; Meyertons, Hood, Kivlin, Kowert & Goetzel, P.C.

(57) ABSTRACT

The software transactional memory system described herein may implement a revocable mechanism for managing read ownership in a shared memory. In this system, write ownership may be revoked by readers or writers at any time other than when a writer transaction is in a commit state, wherein its write ownership is irrevocable. An ownership record associated with one or more locations in the shared memory may include an indication of whether the memory locations are owned for writing, and an identifier of the latest writer. A read ownership array may record data indicating which, if any, threads currently own the memory locations for reading. The system may provide an efficient read-validation operation, in which a full read-set validation is avoided unless a change in a global read-write conflict counter value indicates a potential conflict. The system may support a wide range of contention management policies, and may provide implicit privatization.

20 Claims, 9 Drawing Sheets

OTHER PUBLICATIONS

Vijay Menon et al., "Single Global Lock Semantics in a Weakly Atomic STM," In Transact 2008, Describes Intel's privatization scheme in Figure 9, found at http://www.unine.ch/transact08/papers/Menon-Single.pdf and http://www.unine.ch/transact08/slides/Menon-Single.pdf, Feb. 11, 2008.

U.S. Appl. No. 10/669,948, filed Sep. 24, 2003.

U.S. Appl. No. 12/492,613, filed Jun. 26, 2009.

U.S. Appl. No. 12/350,792, filed Jan. 8, 2009.

U.S. Appl. No. 12/242,551, filed Sep. 30, 2008.

U.S. Appl. No. 11/008,692, filed Dec. 9, 2004.

Yossi Lev, et al., "Anatomy of a scalable software transactional memory," TRANSACT 2009: The 4th ACM SIGPLAN Workshop on Transactional Computing, Feb. 15, 2009, all pages.

* cited by examiner

SYSTEM AND METHOD FOR PERFORMING VISIBLE AND SEMI-VISIBLE READ OPERATIONS IN A SOFTWARE TRANSACTIONAL MEMORY

BACKGROUND OF THE INVENTION

1. Field of the Invention

This invention relates generally to concurrent access to shared objects, and more particularly to a system and method for implementing a scalable transactional memory that includes mechanisms to support revocable read ownership and write ownership that is revocable except during a transaction commit operation.

2. Description of the Related Art

The multi-core revolution currently in progress is making it increasingly important for applications to exploit concurrent execution in order to take advantage of advances in technology. Shared-memory systems allow multiple threads to access and operate on the same memory locations. To maintain consistency, threads must often execute a series of instructions as one atomic block, or critical section. In these cases, care must be taken to ensure that other threads do not observe memory values from a partial execution of such a block. Such assurances are important for practical and productive software development because without them, it can be extremely difficult to manage the interactions of concurrent threads. Traditional constructs, such as mutual exclusion and locks may be used by a thread to ensure correctness by excluding all other threads from concurrent access to a critical section. For example, no thread may enter a critical section without holding the section's lock. While it does, all other threads wishing to execute the critical section must await the lock's release and acquire it before proceeding.

The pitfalls of these constructs are numerous and well known. They include dead-lock, priority inversions, software complexity, and performance limitations. Locking large sections of code and/or code that accesses a lot of data is a heavy-handed approach to concurrency control.

Alternatively, it may be possible to increase parallelism by allowing multiple threads to execute a critical section at one time if the executions do not rely on overlapping memory locations. This may increase performance and mitigate many of the pitfalls normally associated with traditional locking mechanisms. However, such interleaved executions are not guaranteed to be correct.

Transactional memory is a mechanism that can be leveraged to enable concurrent and correct execution of a critical section by multiple threads. Transactional memory allows a thread to execute a block of instructions either completely and atomically or not at all. As typically defined, a transactional memory interface allows a programmer to designate certain sequences of operations as "atomic blocks" and "transactions," which are guaranteed by the transactional memory implementation to either take effect atomically and in their entirety (in which case they are said to succeed), or to be aborted, such that they have no externally visible effect (in which case they are said to fail). Thus, with transactional memory, it may be possible in many cases to complete multiple operations with no possibility of another thread observing partial results, even without holding any locks. The transactional memory paradigm can significantly simplify the design of concurrent programs.

In general, transactional memory can be implemented in hardware (HTM), or in software (STM).

SUMMARY

A system and method for providing a scalable software transactional memory may in some embodiments support implicit privatization, and may allow the use of a variety of contention management strategies, while keeping the overhead for read ownership management and read validation low. In various embodiments, the system does not allow the blocking of one transaction by another transaction that is executing user code.

The software transactional memory system described herein may in various embodiments implement a revocable mechanism for managing read ownership in a shared memory. In various embodiments, write ownership may be revoked by readers or writers at any time other than when a writer transaction is in a commit state, during which its write ownership is irrevocable. An ownership record associated with one or more locations in the shared memory may include an indication of whether the memory locations are owned for writing, and an identifier of the latest writer. A read ownership array associated with the one or more memory locations may record data indicating which, if any, threads currently own the memory locations for reading. The system may provide an efficient read-validation operation, in which a full read-set validation is avoided unless a change in a global read-write conflict counter value indicates a potential conflict.

As described herein, a read memory access operation of an atomic transaction may attempt to acquire read ownership of a location in the shared memory targeted by the read memory access operation and may perform the read memory access operation only if read ownership of the location targeted by the read memory access operation was successfully acquired. Similarly, a write memory access operation of an atomic transaction may attempt to acquire write ownership of a location in the shared memory targeted by the write memory access operation and may perform the write memory access operation only if write ownership of the location targeted by the write memory access operation was successfully acquired.

In some embodiments, if a transaction successfully acquires write ownership of a location targeted by a write memory access operation, this may result in revoking the read ownership of the location (if any other transactions owned the location for reading), but may not result in deleting or clearing an identifier of any reader transaction(s) recorded in the read ownership array associated with the location. The new writer transaction may store a value in a write ownership status indicator of the ownership record associated with the target location indicating that the location is owned for writing, and may store an identifier of the new writer transaction in the latest writer field of the ownership record. The new writer transaction may also determine whether any other transactions own the location for reading, and if so, may set a local read-write conflict indicator (i.e. one that is private to the writer transaction, such as a thread-local flag) to indicate a potential read-write conflict.

Attempting to acquire read ownership of a location in shared memory may in various embodiments include determining whether another transaction owns the location for writing. In response to determining that no other transaction owns the location for writing, the new reader transaction may store a value indicating that the location is owned for reading in an entry of the read ownership data structure that is associated with the new reader transaction. The new reader transaction may also record an identifier of the latest transaction to own the location for writing in a read set associated with the new reader transaction.

In some embodiments, the system may include a global read-write conflict counter, which may be used to avoid a full read set validation, in many cases. In such embodiments, at the beginning of a transaction, the value of the global read-write conflict counter may be recorded. When the transaction attempts to commit, if its local read-write conflict indicator is set, it may increment the global read-write conflict counter. If, when attempting to commit the transaction, a current value of the global read-write conflict counter (e.g., the value of the global read-write conflict counter immediately before it may be conditionally incremented by the transaction attempting to commit) does not match the value recorded at the beginning of the transaction execution, a full read set validation may be performed to determine if an actual read-write conflict has occurred. Otherwise, the read set may be considered valid and the transaction may commit without performing the full read set validation.

As noted above, in some embodiments, a writing transaction may not block another transaction unless it is in a commit state, i.e. a state in which it has validated its read set, but has not yet committed its results. In such embodiments, attempting to acquire write ownership of a location in the shared memory may include determining whether another transaction owns the location for writing, and (if another transaction owns the location for writing) determining whether the other transaction is in a commit state. If the other transaction is not in a commit state, the transaction may successfully acquire ownership of the transaction.

Figure 1:
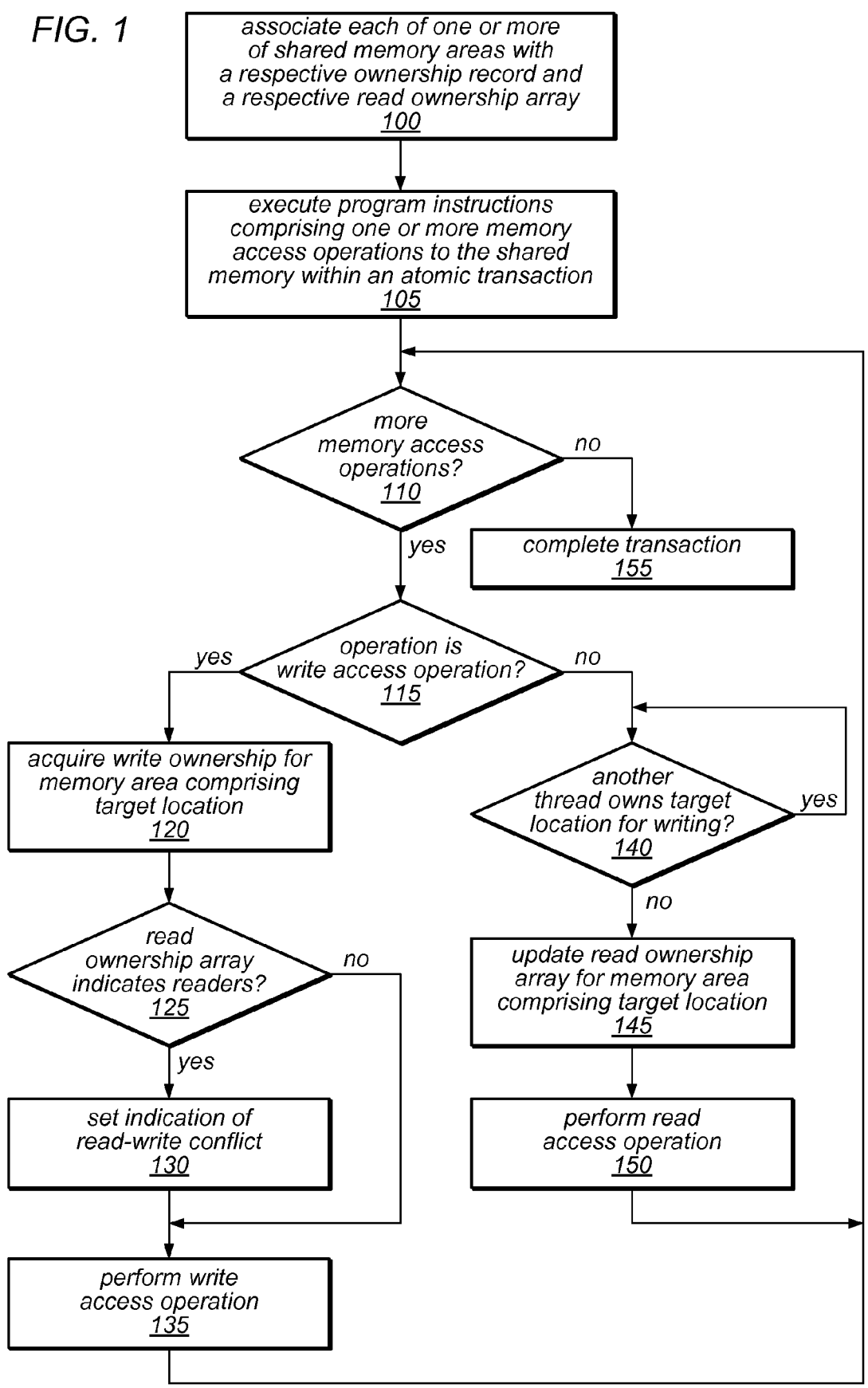
FIG. 1 is a flow diagram illustrating one embodiment of a method for managing read and write ownership of a transaction, as described herein.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

As used herein, the term transaction may refer to a series of program instructions that may be executed together as an atomic operation. As described above, if the transaction succeeds (i.e. is successfully committed), then any resulting changes to shared memory may become visible to entities other than the actor. If a transaction does not succeed (i.e. is aborted), then the transaction attempt will have caused no change to any shared memory location.

In some embodiments, the system described herein may support both visible reads, in which each reader "registers" for each memory location it reads, so that a transaction wishing to write it can identify and abort such readers, and semi-visible reads, in which a transaction that wishes to write to a memory location can determine whether any other transaction is reading the location, but not which transaction(s) are reading the location. The system described herein may be configured to determine when writers conflict with readers and to avoid expensive read set validation in the vast majority of cases in which no writer-reader conflicts have occurred during execution of a transaction.

The system described herein may implement a deferred write approach, recording transactional writes (i.e. memory write accesses included in an atomic transaction) in a private write set until a commit phase, during which they are copied back to shared memory. In various embodiments, a transaction may own a location either for reading or for writing. In various embodiments, write ownership may be exclusive to one transaction at a time, while read ownership may be shared between multiple transactions.

The system described herein may include efficient data structures for controlling read and write ownership of one or more locations in a shared memory that do not require most readers to use a compare-and-swap (CAS) operation, or a similar atomic synchronization primitive, such as load-linked/store-conditional (LL/SC) operation pair, when acquiring read ownership. In some embodiments, a data structure (i.e. an ownership record) may be associated with one or more locations in a shared memory, and may include an indication of whether the one or more locations are owned for writing, and an identifier of the latest transaction to have owned the one or more locations for writing (which may identify a current writer). In some embodiments, another data structure (i.e. a read ownership array) may record data indicating which, if any, threads currently own the one or more locations for reading. For example, if the read ownership array includes k single-byte entries, data stored in each entry (or slot) in the array may indicate whether a corresponding one of k threads, denoted as slotted threads, owns the one or more locations for reading.

In some embodiments, a memory area (and/or its ownership record) is said to be owned for writing if and only if its write ownership status bit indicates so (e.g., if it is non-zero). The memory area (and/or its ownership record) is said to be owned for reading if and only if one or more of the entries in its read ownership array is non-zero, and the write ownership status bit indicates that it is not owned for writing. Otherwise, the memory area and its ownership record may be considered free (not owned).

In some embodiments, when read ownership is revoked, the owners are not notified and aborted. In such embodiments, it may be each reader's responsibility to validate its own read set and to abort itself if any of its read ownerships have been revoked. In some embodiments, when a transaction acquires read ownership of a set of one or more locations associated with an ownership record and corresponding read ownership array, the transaction may record a snapshot including an identifier of the last transaction that owned the one or more locations for writing. These snapshots may be kept in a private read set, and subsequently used to validate the transaction, i.e., to determine whether any of the transaction's read ownerships have been revoked. In various embodiments, a completed transaction, whether committed or aborted, may relinquish all of its ownerships.

As described in more detail herein, in order to commit its results to shared memory, a transaction (after validating its read set for the last time) may atomically change its state to committed (e.g., using a CAS-type operation). This may serve to render the transaction's corresponding write ownerships irrevocable until they are released. In such embodiments, once a transaction changes its state to committed, it becomes blocking (i.e. concurrent transactions attempting to access locations that are owned for writing by the committed transaction must wait for the committed transaction to release ownership of those locations). In the system described herein, however, a transaction may never block other transactions while it is executing user code.

In some embodiments, to reduce overhead typically associated with read set validation, the system described herein may increment a global read-write conflict counter only when a writing transaction that conflicts with a reader commits, rather than when any transaction commits. In such embodiments, there may be no need for the writing transaction to perform a full validation of its read set if the read-write conflict counter value has not changed since the last time the read set was known to be valid (e.g., at the beginning of the transaction). Using CAS (or a similar atomic operation) to increment a global read-write conflict counter may in some embodiments allow the transaction to simultaneously confirm that the counter has not changed, and thus to effect read validation. In the case that the counter has changed, the writing transaction may perform a full read set validation in addition to incrementing the global read-write conflict counter. Note that, in some embodiments, if the writing transaction fails to increment the read-write conflict counter due to another transaction having successfully incremented it (e.g., using a CAS-type operation), then it may not be necessary for the writing transaction to retry the increment. This is because the increment performed by the other transaction may serve the same purpose as the increment attempted by the writing transaction.

The methods described herein may in some embodiments be applied in a hybrid transactional memory system that allows transactions to be executed using hardware transactional memory support if available and effective, and otherwise executing transactions in software. Hybrid transactional memory requires hardware and software transactions to interoperate correctly. The methods described herein may in some embodiments reduce overhead needed for hardware transactions and may avoid aborting them unnecessarily.

The system described herein may in various embodiments implement an efficient and revocable mechanism for managing read ownership in a shared memory. For example, a transaction may acquire the metadata associated with a location it wrote without waiting for another active transaction, i.e., one which previously acquired the metadata for reading, to release ownership. As previously noted, in various embodiments, write ownership may be revoked by readers or writers at any time, except for a short period when the transaction executes its commit operation, during which its write ownership becomes irrevocable. Therefore, in the system described herein, a transaction may never be blocked by another transaction that is executing user code. In some embodiments, such a system may support a wide range of contention management policies (e.g., policies that determine when, and under what circumstances, read and/or write ownership should be revoked). The system may not guarantee internal read consistency, but instead may provide an efficient read-validation operation to test for it. In some embodiments, a compiler framework for the system may allow for validating after every read, so that when the transactional memory described herein is used in that context, there may be no disadvantage for the programmer (i.e. the code executed by the transaction may never operate on an inconsistent state). Furthermore, various methods may be applied for eliding validation where it is unnecessary, some of which are described herein. In addition, in some embodiments, the transactional memory system described herein may provide implicit privatization, as described herein.

Note that various embodiments described herein assume a Total Store Order (TSO) memory model. However, in other embodiments, the techniques may be extended to other common memory models, as well.

FIG. 1 is a flow diagram illustrating one embodiment of a method for managing read and write ownership of a transaction, using the mechanisms described herein. As shown in 100, the method may include associating each of one or more shared memory areas with a respective ownership record and a respective read ownership array. The method may include a thread executing program instructions comprising one or more memory access operations (e.g., read and/or write operations) targeting one or more locations in the shared memory. As shown in 105 of FIG. 1, these memory access operations may be included in an atomic transaction. That is, they may designated as a group of operations that are to take effect in their entirety or to have no visible effect, as described above.

Figure 3:
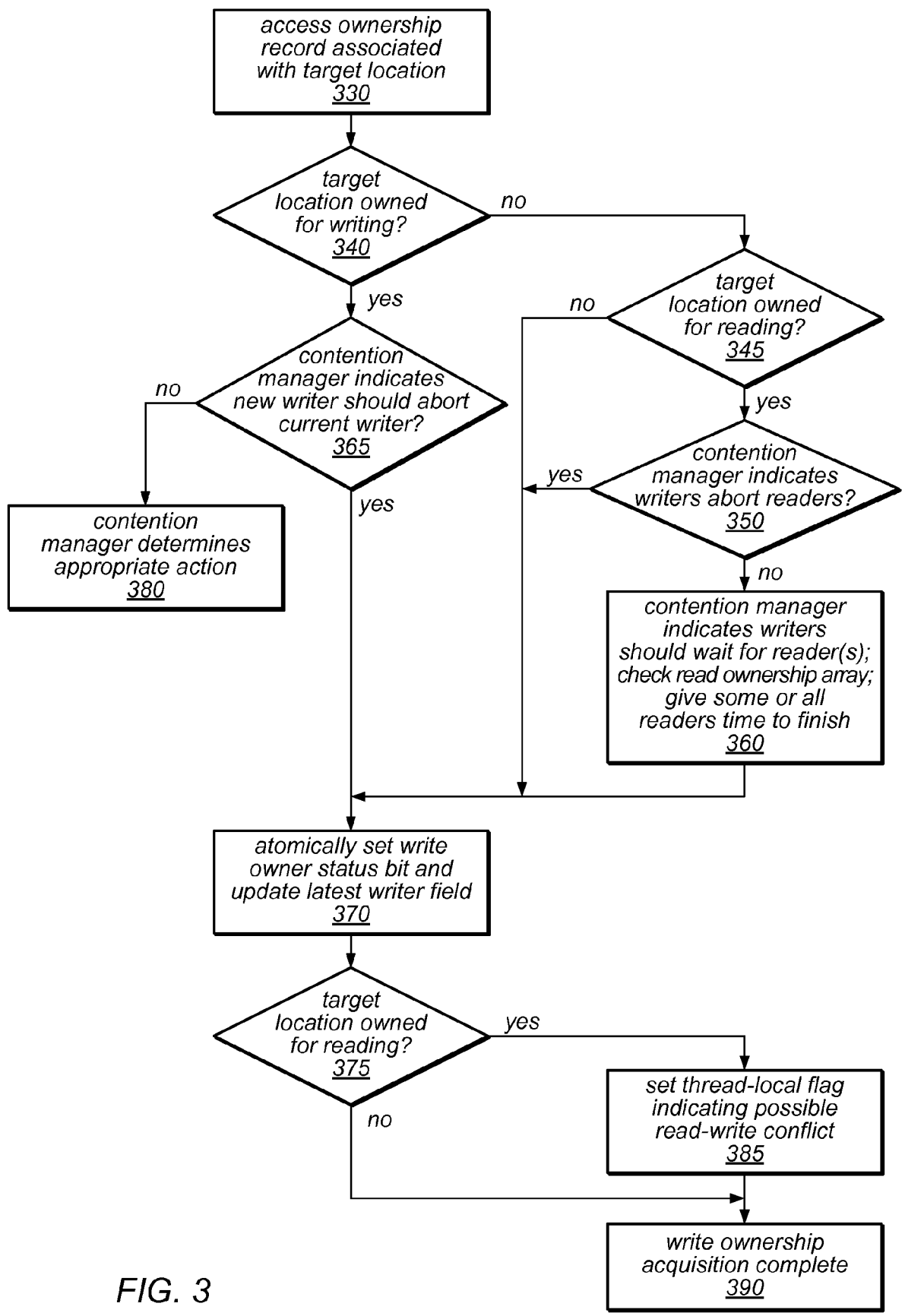
FIG. 3 is a flow diagram illustrating one embodiment of a method for updating write ownership of a memory area, as described herein.

In the example illustrated in FIG. 1, the operations shown in 110-150 are repeated for each of the memory access operations within the atomic transaction until the atomic transaction completes, as in 155. As illustrated in FIG. 1, for each memory access operation, if the access operation is a write operation, shown as the positive exit from 110, the method may include the transaction acquiring write ownership for the memory area comprising the target location (i.e. the location at which a value is to be written by the write access operation), as in 120. One method for a transaction to acquire write ownership is illustrated in FIG. 3, and described in more detail below.

As shown in this example, the method may include determining if there are any transactions that have read ownership of any locations in the memory area comprising the target location, as in 125. In some embodiments, this determination may include accessing the read ownership array associated with this memory area to determine if any entries of the array are non-zero. If one or more transactions are current readers of the memory area, shown as the positive exit from 125, the method may include setting an indication of a possible read-write conflict (e.g., a thread-local read-write conflict flag), as in 130. Note that setting a read-write conflict indicator does not necessarily mean that an actual read-write conflict has occurred (or will occur), since the specific memory location targeted by the write access operation may not be the same location with the memory area targeted by a transaction that has read ownership of the memory area. However, in some embodiments, a read-write conflict indicator may be set to indicate that a full read set validation may be appropriate. Various methods for performing read set validation and determining when to perform read set validation are described in more detail below. If there are no transactions having read ownership of the memory area comprising the target location (shown as the negative exit from 125), or after setting an indication of a possible read-write conflict, the method may include performing the write access operation, as in 135.

As shown in this example, if the memory access operation is a read operation, indicated by the negative exit from 115 in FIG. 1, the method may include determining whether another transaction owns the memory area comprising the target location (i.e. the location from which a value is to be read by the read access operation), as in 140. If so, shown as the positive exit from 140, the method may in some embodiments include waiting until no other transaction owns the memory area for writing. This is illustrated in FIG. 1 as the feedback loop to the input to 140. In other embodiments (not shown), in response to determining that another transaction owns the memory area for writing, the method may include aborting the current transaction (i.e. the transaction attempting to perform a read access operation), the current transaction aborting the transaction that owns the memory area for writing, and/or the current transaction stealing ownership of the memory area, e.g., according to a contention management policy or at the direction of contention manager.

Figure 2:
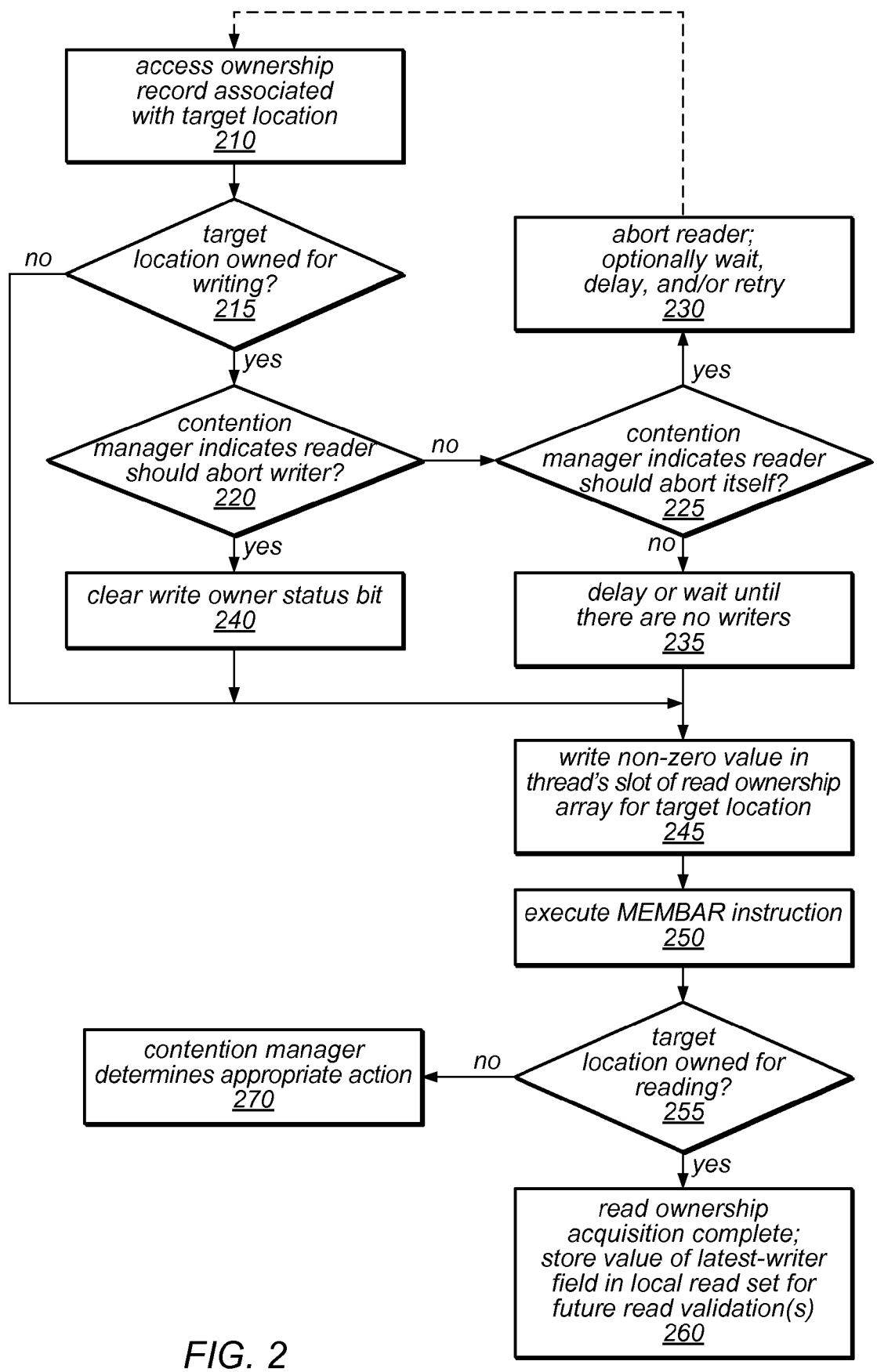
FIG. 2 is a flow diagram illustrating one embodiment of a method for updating read ownership of a memory area, as described herein.

As shown in this example, if no other transaction owns the memory area comprising the target location for writing (of if the current transaction steals ownership away from another transaction that owned the memory area for writing), the method may include the current transaction updating the read ownership associated with the memory area to indicate that the current transaction owns the memory area for reading, as in 145. One method for updating read ownership is illustrated in FIG. 2 and described in more detail below. Once the current transaction has obtained read ownership of the memory area comprising the target location, the method may include the transaction performing the read access operation, as in 150.

As described above, if there are more memory access operations within the atomic transaction, the method may include repeating the operations illustrated as 110-150 in FIG. 1 for each additional memory access operation within the atomic transaction. Once all memory access operations have been performed, shown as the negative exit from 110, the method may include completing the transaction, as in 155. Note that completing the transaction may include attempting to commit the action and/or performing a partial or full read set validation, according to various embodiments. Therefore, completing the transaction may involve successfully committing the transaction or aborting the transaction, depending on the result of the attempt to commit the transaction and/or the result of the read set validation. Various methods for performing read validation and committing transactions are described in more detail herein.

One embodiment of a method for updating read ownership of a memory area that includes a location targeted by a read access operation is illustrated by the flow diagram in FIG. 2. As shown in this example, the method for acquiring read ownership of a memory area may include accessing the ownership record associated with the memory area, as in 210, and determining whether the memory area is currently owned for writing by another transaction, as in 215. For example, in some embodiments, the ownership record associated with each memory area includes an indication of whether the memory area is currently owned for writing (e.g., a write ownership status bit). If the memory area is currently owned for writing, shown as the positive exit from 215, the method may include using a contention manager to determine whether the current transaction (the transaction attempting to acquire read ownership) should attempt to abort the current writer (i.e. the transaction that currently owns the memory area for writing) and then steal the ownership of the memory area, the current transaction should wait until the memory area is no longer owned for writing before proceeding, or the current transaction itself should be aborted.

If the contention manager indicates that the current transaction (i.e. the new reader) should abort the current writer, shown as the positive exit from 220, the method may include the current transaction clearing the indication in the ownership that the memory area is owned for writing (e.g., clearing the write ownership status bit), as in 240, and then proceeding with the attempt to acquire read ownership of the memory area. If the contention manager indicates that the current transaction (i.e. the new reader) should abort itself, shown as the positive exit from 225, the method may include aborting the current transaction, as in 230. As illustrated in this example, in some embodiments, the method may include delaying (e.g., waiting a predetermined length of time), waiting until the memory area comprising the target location is no longer owned for writing, and/or retrying the new reader transaction (which may result in repeating the operations illustrated in FIG. 2). If the contention manager does not indicate that the current transaction or current writer transaction should not be aborted, shown as the negative exit from 225, the method may include delaying (e.g., waiting for a predetermined amount of time) or waiting until the memory area comprising the target location is no longer owned for writing before attempting to update the read ownership array associated with the memory location, as in 235.

As illustrated in FIG. 2, if the memory area was not owned for writing (shown as the negative exit from 215), after stealing ownership from a writer transaction (shown as 240), or after delaying or waiting until the memory location is no longer owned for writing (as in 235), the method may include writing a non-zero value (e.g., 1) into an entry (or slot) corresponding to the currently executing thread (i.e. the thread executing the new reader transaction) in the read ownership array associated with the memory area, as in 245. The method may then include executing a memory barrier (e.g., a MEMBAR instruction), as in 250. As used herein, the term "MEMBAR instruction" may refer to one or more instructions that, when executed by a thread, ensures that the results of all store operations of the thread that come before the MEMBAR in program order are visible to all threads, including the executing thread. For example, if a given thread stores a first value to a first memory location, then executes a MEMBAR followed by a load operation, the MEMBAR operation ensures that the first value is visible to (i.e., readable by) all threads in the system before the subsequent load operation is executed. In some embodiments where out-of-order processing is utilized, memory access operations that are subsequent to a MEMBAR operation in program order may not be reordered to execute before the MEMBAR operation.

As illustrated in FIG. 2, the method may include re-reading the ownership record associated with the memory area comprising the target location to determine whether the target location is now owned for reading or for writing, as in 255. As previously noted, in some embodiments, if a write ownership status bit within an ownership record is set, this indicates that the associated memory area is owned for writing. In some such embodiments, in order for a memory area to be owned for reading, this write ownership status bit must not be set, and at least one entry (slot) in the read ownership array associated with the memory area must include a non-zero value. If the memory area comprising the target location (and thus, the target location itself) is owned for reading, shown as the positive exit from 255, read ownership acquisition is complete, as in 260. In some embodiments, once read ownership has been acquired, the method may include reading the value of a latest-writer field of the ownership record associated with the memory area and storing the read value of the latest-writer field in the local read set of the transaction for future read validations, as shown. If, on the other hand, the target location is not owned for reading, shown as the negative exit from 255, the method may include using the contention manager to determine an appropriate action (e.g. waiting, abort the current transaction, aborting the current writer, etc.). Note that if the decision is to wait, the currently executing thread may choose whether or not to undo its write to the read ownership array, in some embodiments. Various approaches involving undoing or not undoing the write to the read ownership array are described in more detail below.

One method for acquiring write ownership of a memory area (e.g., a memory area comprising a location targeted by a write access operation) is illustrated by the flow diagram in FIG. 3, according to various embodiments. As illustrated in this example, the method for acquiring write ownership of a memory area may include the currently executing thread (i.e. a thread executing a transaction attempting to acquire write ownership of the memory area) accessing the ownership record associated with the memory area, as in 330, and determining if the memory area is currently owned for writing, as in 340. For example, in some embodiments, the ownership record associated with each memory area includes an indication of whether the memory area is currently owned for writing (e.g., a write ownership status bit). If the memory area is currently owned for writing, shown as the positive exit from 340, the method may include using a contention manager to determine one or more appropriate actions. For example, in some embodiments, a contention manager may be configured to determine whether the current transaction (the transaction attempting to acquire write ownership) should attempt to abort the current writer (i.e. the transaction that currently owns the memory area for writing) and then steal the ownership of the memory area, the current transaction should wait until the memory area is no longer owned for writing before proceeding, or the current transaction itself should be aborted.

If the contention manager indicates that the current transaction (i.e. the new writer) should abort the current writer, shown as the positive exit from 365, the method may include the current transaction atomically setting an indicator of write ownership (e.g., setting a write ownership status bit) and updating the latest-writer field of the ownership record associated with the memory area (e.g., writing an identifier of the current thread and/or transaction to indicate that the current thread now owns the associated memory area for writing). This is shown as 370 in FIG. 3. If the contention manager does not indicate that the current transaction should abort the current writer, shown as the negative exit from 365, the method may include the contention manager determining an appropriate action, as in 380. For example, in some embodiments, the contention manager may indicate that the current transaction should be aborted (or should abort itself). In other embodiments, the contention manager may indicate that the current transaction should delay (e.g., wait a predetermined length of time), wait until the memory area comprising the target location is no longer owned for writing, and/or retrying the new writer transaction (resulting in the eventual repeating of the operations illustrated in FIG. 3).

As illustrated in FIG. 3, if the memory area was not owned for writing (shown as the negative exit from 340), the method may include determining whether the target location is owned for reading, as in 345. For example, in some embodiments, in order for a memory area to be owned for reading, the write ownership status bit in the ownership record associated with the memory area must not be set, and at least one entry (slot) in the read ownership array associated with the memory area must include a non-zero value. If the memory area comprising the target location (and thus, the target location itself) is owned for reading, shown as the positive exit from 345, and if the contention manager indicates that writers should abort the current readers (e.g., if the applicable contention management policy is that writers always abort readers), the method may include the current transaction atomically setting an indicator of write ownership (e.g., setting a write ownership status bit) and updating the latest-writer field of the ownership record associated with the memory area (e.g., writing an identifier of the current thread and/or transaction to indicate that the current thread now owns the associated memory area for writing). This is shown as the positive exit from 350 and element 370 in FIG. 3. In some embodiments, the current thread may perform a CAS operation (or similar) to atomically update the write ownership status bit to indicate that the associated memory area is owned for writing, and the latest-writer field to a value identifying the new owner. In such embodiments, this operation serves to automatically steal the read ownership from any readers that might have owned the memory location for reading prior to the write ownership status bit being set.

In some embodiments, the contention manager may indicate that the current thread (i.e. the thread attempting to acquire write ownership of the associated memory area) should wait for one or more current readers to complete their transactions before stealing read ownership. For example, in some embodiments, the current thread may first read the read ownership array associated with the memory area to determine whether the memory area is owned for reading (i.e. to determine if there are any current reader transactions), and may give some or all of the readers time to finish. In some such embodiments, the current thread may delay the operations illustrated in 370 for a pre-determined amount of time, which may allow some or all of the reader transactions to complete and to avoid stealing read ownership from them. This is illustrated in 360. Note that in some embodiments, drain functionality may be implemented to ensure that new readers will not acquire read ownership while the current thread (i.e. the thread executing the transaction attempting to acquire write ownership) is waiting. For example, the new writer may signal for potential readers to drain by setting a field of the ownership record to a given value (e.g., indicating that the transaction is in the process of acquiring write ownership) and then waiting for the readers to drain before proceeding.

As illustrated in 375, once the current thread has obtained write ownership of the memory area, the method may include the thread reading the read ownership array associated with the memory area to determine whether there are any transactions that owned the memory area for reading prior to the write ownership acquisition operation. If there are such readers, the method may include the thread setting a thread-local flag to indicate a possible read-write conflict. In some embodiments, setting such a read-write conflict flag may indicate to the thread that it should report this possible conflict later (e.g., via an increment of a read-write conflict counter, or another modification of the value of the read-write conflict counter), as described in more detail below. In this example, if there are no reader transactions (shown as the negative exit from 375), or once the current thread has set the thread-local conflict flag, the write ownership acquisition is complete, as in 390.

Note that, in various embodiments, a writer does not erase the information identifying any current readers when obtaining write-ownership. Instead, this information remains stored in the read ownership array. In some such embodiments, future writers attempting to steal ownership may determine for themselves whether they must increment the global read-write conflicts counter. Thus, notifying them about any past conflicts may be unnecessary.

Figure 4:
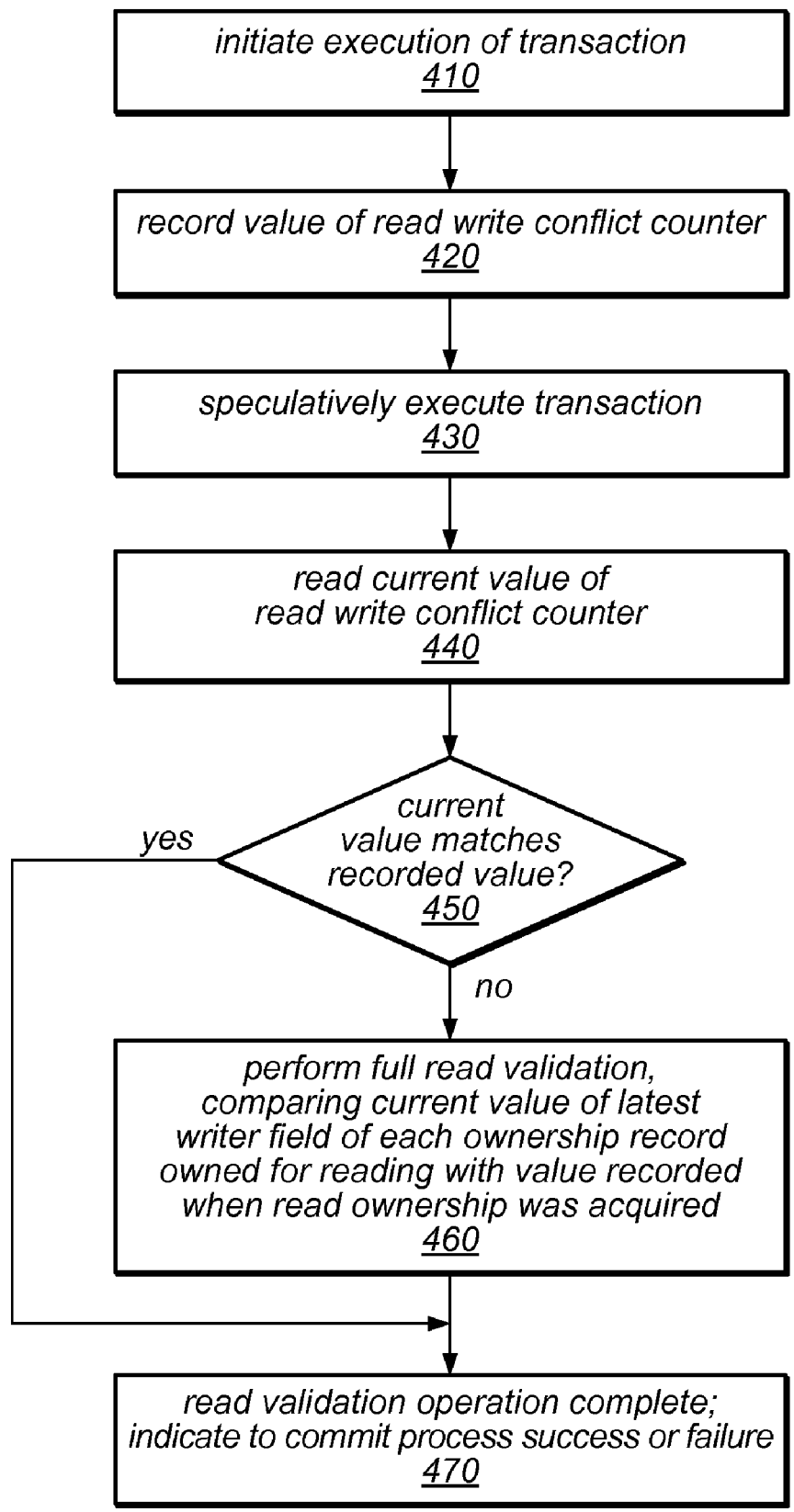
FIG. 4 is a flow diagram illustrating one embodiment of a method for performing read validation for a transaction, as described herein.

As previously noted, in some embodiments, completing a transaction may include performing a validation of the read set of the transaction prior to, or as a part of, a commit operation. FIG. 4 is a flow diagram illustrating one embodiment of a method for performing such a read validation. As illustrated in this example, the method may include initiating execution of a transaction, as in 410. At this point (i.e. the beginning of the transaction), the read set of the transaction may be considered valid, and the method may include recording the value of a global read-write conflict counter at this point, as in 420. After speculatively executing the transaction (shown as 430), the method may include reading the current value of the read-write conflict counter, as in 440. If the value of the read-write conflict counter has not changed since it was read and recorded at the beginning of the transaction, shown as the negative exit from 450, the read validation operation is complete (i.e. without performing a full read set validation), and the method may include indicating to the commit operation that the read validation was successful (i.e. that no other transactions have modified the values of the locations in the transaction's read set while the transaction was executing). This is illustrated at 470.

In this example, if the value of the read-write conflict counter has changed since it was read and recorded at the beginning of the transaction, the method may include performing a full read validation of the transaction's read set. This is shown in FIG. 4 as the negative exit from 450 and as element 460. As noted above, in some embodiments, an executing thread stores the value of the latest-writer field of the ownership record associated with a memory area in the current transaction's read set when the transaction acquires read ownership of the memory area. In such embodiments, performing a full read set validation for a current transaction may include comparing the current value of the latest-writer field in each ownership record associated with memory areas that the current transaction owns for reading with the value it had when read ownership of the memory area was acquired (i.e. comparing the current values with the values stored in the transactions' read set). If any of the current values of the latest-writer fields associated with locations in the transaction's read set do not match the previously recorded values, the method may include indicating to the commit operation that the read validation failed (i.e. that one or more other transactions may have modified the values of the locations in the transaction's read set while the transaction was executing) and that the transaction should not be committed. If, on the other hand, all of the current values of the latest-writer fields associated with locations in the transaction's read set match the previously recorded values, the method may include indicating to the commit operation that the read validation was successful (i.e. that no other transactions have modified the values of the locations in the transaction's read set while the transaction was executing), and that the transaction may be committed. This is illustrated at 470.

Figure 5A:
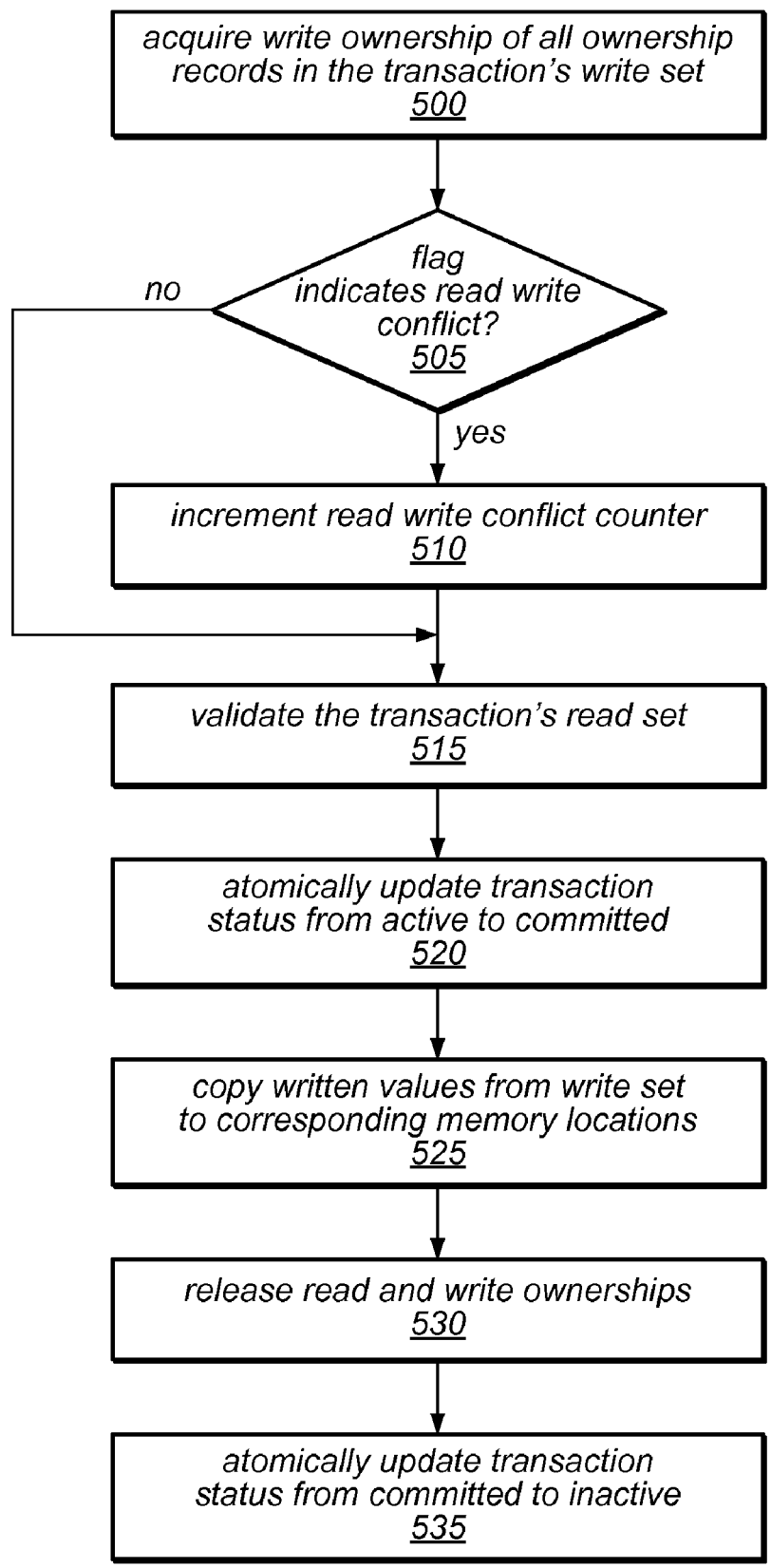
FIGS. 5A-5C are flow diagrams illustrating various embodiments of a method for committing a transaction, as described herein.
Figure 5B:
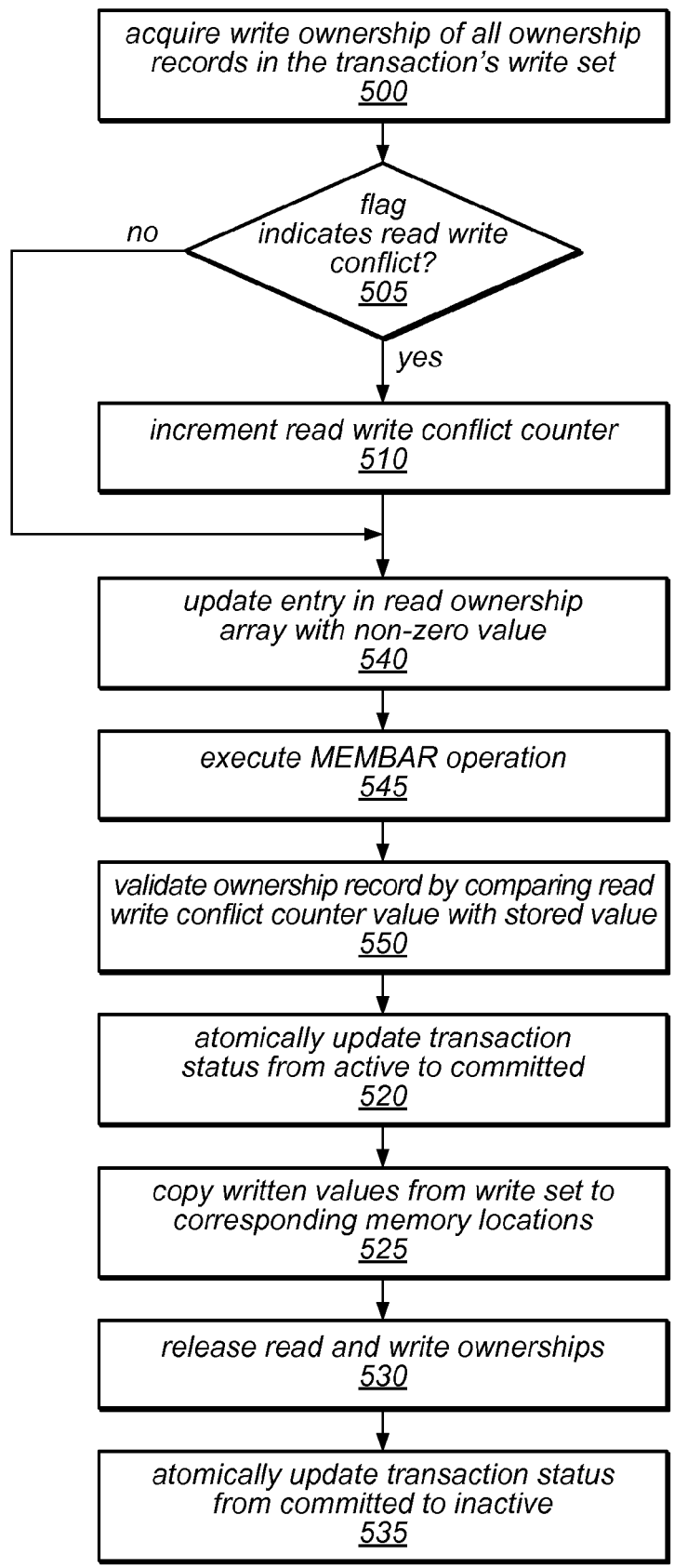
Figure 5C:
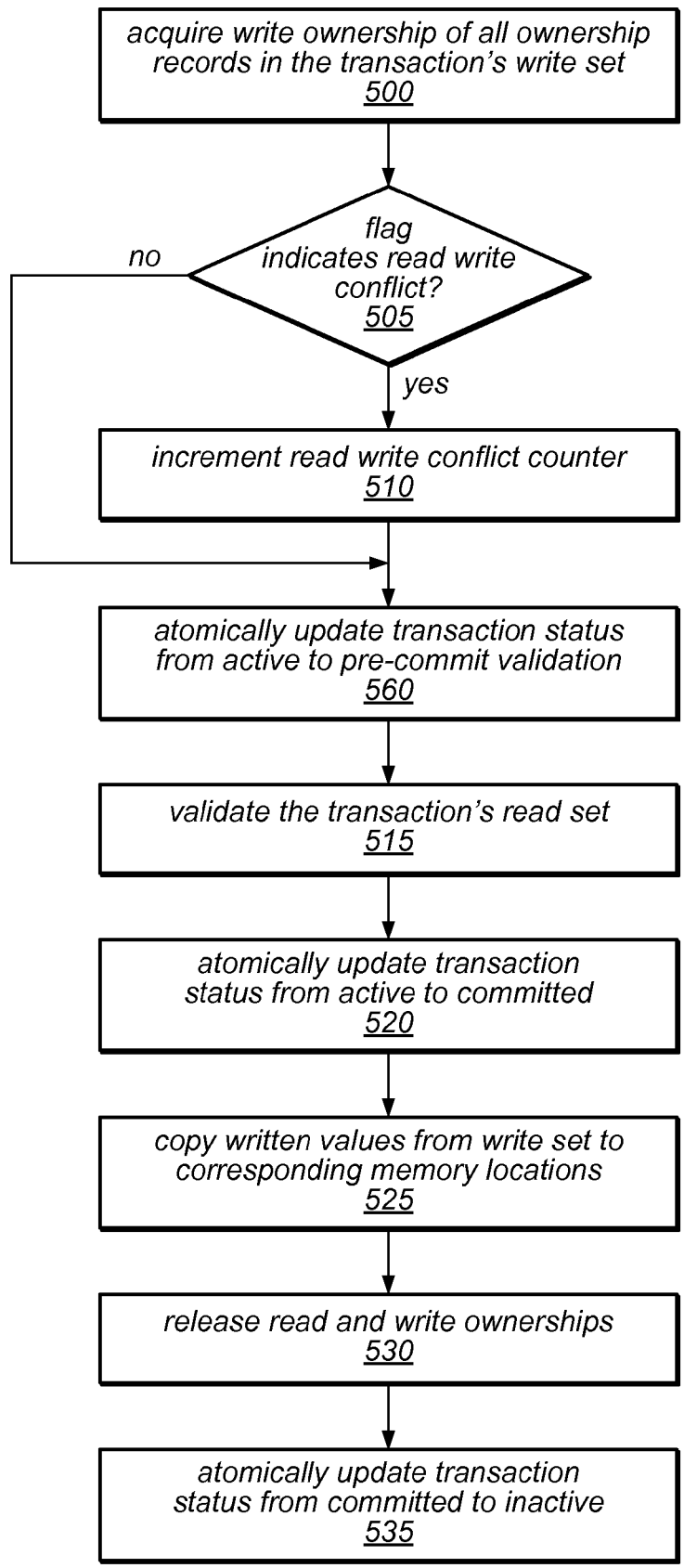

As previously noted, in some embodiments, completing a transaction may include performing a commit operation, by which any changes to shared memory made by the transaction become visible to other processes or threads having access to the shared memory. As described above, in some embodiments, the results of a transaction (e.g., any changes in the values stored at locations in the transaction's write set) are committed (i.e. written to the shared memory) if and only if the read set of the transaction has been successfully validated. Various methods for committing a transaction are illustrated by the flow diagrams in FIGS. 5A-5C, according to different embodiments. FIG. 5A illustrates a method for committing a transaction that does not include support for implicit privatization, while FIGS. 5B and 5C illustrate methods for committing a transaction in a system that support implicit privatization, according to different embodiments.

As shown in the example illustrated in FIG. 5A, the method may include the committing transaction acquiring write ownership of all ownership records associated with memory locations in the transaction's write set, if write ownership was not already acquired while the transaction code was executing. This is shown as 500 in FIG. 5A. As illustrated in this example, if the local read-write conflict indicator (such as the thread-local read-write conflict flag described above) indicates that there may be one or more read-write conflicts associated with the transaction (shown as the positive exit from 505), the method may include incrementing a global read-write conflict counter, as in 510. In other embodiments, if the read-write conflict indicator indicates that there may be one or more read-write conflicts associated with the transaction, the method may include a different modification to a global read-write conflict indicator, such as incrementing a read-write conflict counter by an amount other than one, decrementing the value of such a counter by one or more, or multiplying the value of a global read-write conflict indicator by a given amount. In still other embodiments, rather than using a change in a count-type value as a global indicator of possible read-write conflicts, a global read-write conflict mechanism may record, modify, and/or compare timestamp values at different points in the execution of a transaction (e.g., recording a timestamp value at the beginning of a transaction, updating the timestamp value in response to identifying a potential read-write conflict, and later comparing a current timestamp value to that recorded at the beginning of the transaction when attempting to commit the transaction).

As illustrated in this example and described above, committing a transaction may include validating the transaction's read set, as in 515. For example, in some embodiments the transaction's read set may be validated using the method illustrated in FIG. 4 and described above. Once the read set is successfully validated, the method may include atomically updating the state of the transaction from active to committed, as in 520 (e.g., using a CAS operation, or similar). Note that if the read set validation fails, the transaction commit operation may fail, and none of the changes to the transaction's write set will be updated in the shared memory (not shown).

Note also that, in some embodiments, if the local read-write conflict flag indicates that the read-write conflicts counter should be incremented, a single CAS-type operation may be used to increment the read-write conflicts counter if its value equals that of the latest snapshot of the counter recorded by the thread. In some such embodiments, a full read set validation may only be necessary if this CAS-type operation fails after the read-write conflicts counter is successfully incremented.

As illustrated in FIG. 5A, in some embodiments, the method may include the committing transaction copying values that were written by the transaction to locations in its write set to their corresponding memory locations in the shared memory, as in 525. Once all changes have been made in the shared memory, the method may include the committing transaction releasing read and/or write ownership of the locations in its read and write sets, as in 530, and changing the state of the transaction from committed to inactive, as in 535.

In some embodiments, releasing read ownership of locations in the transaction's read set may be done simply by setting to zero (i.e. clearing) the value of the entries (slots) in the read ownership array associated with the locations that the transaction owns for reading using an ordinary store-type operation, i.e. without the need to execute a CAS-type operation (such a compare-and-swap operation, an LL/SC pair, a test-and-set operation, etc.) or a subsequent memory barrier operation. In some embodiments, releasing write ownership of locations in the transaction's write set may be done by setting to zero (i.e. clearing) the write ownership status bit in each ownership record associated with locations that the transaction owns for writing. Note that while write ownership may be revocable during execution of transaction code, in some embodiments, write ownership may become irrevocable once the transaction state is committed. In such embodiments, releasing write ownership may be done using an ordinary store-type operation, as well (i.e. without using a CAS-type operation or executing a subsequent memory barrier operation). Note also that any of the operations illustrated in 500, 515, or 520 may fail, which may result in the transaction being aborted rather than committed. In this case, the transaction may release its read and write ownerships and cease execution.

In some embodiments, the transactional memory may be configured to support privatization, such that a thread may use a transaction to "isolate" a shared chunk of memory so that no other thread should be able to access it (e.g., by setting all shared references to that memory chunk to NULL), and thereafter (non-transactionally) operate on that memory as though it were private. Allowing non-transactional access to private memory may in some embodiments be beneficial for both performance and interoperability reasons. However, in some prior transactional memory implementations, an isolated buffer may still be written by another thread after the thread isolating the buffer finishes committing. For example, in a transactional memory that includes deferred writes (i.e., one in which values written by a transaction are kept in a write set and copied back to the memory when the transaction commits, as opposed to one which writes immediately in place and undoes those writes if the transaction aborts), the other thread may have committed before the buffer was isolated but while it is still copying its write set back to memory. A similar problem may occur with writes by aborted transactions in transactional memory systems that perform in-place writes. These writes may interfere with the thread that thinks the memory is private.

The transaction memory system described herein may be configured to support an implicit privatization guarantee such that a transaction T must defer returning from its commit operation until any other transaction that:

a) might have read something T has written, and b) might be in its copy-back phase, where the values from its write-set are copied to their appropriate locations in shared memory completes its copy-back phase.

In some embodiments, this may be achieved by changing the release write ownership operation shown in 530 of FIG. 5A and described above such that the thread waits until all entries in the read ownership array associated with an ownership record are zero, and only then releases write ownership. In such embodiments, the release operation of 530 may include the following steps:

Release read ownership as described above

For each ownership record owned for writing:

Scan the associated read ownership array until all of its entries are zero

Release write ownership of the ownership record as described above

In some embodiments, this technique may guarantee that a transaction T waits for any other transaction that might have had read ownership of the ownership record before T acquired it for writing to release its read ownership before releasing write ownership. In some embodiments, however, it may be the case that a transaction may be blocked waiting for another that is executing user code, because the read ownership is obtained while the user code is executed, and some of these old readers may not yet have started their commit phase.

FIGS. 5B-5C illustrate different methods for committing a transaction that address this potential blocking problem, according to different embodiments. In the example illustrated in FIG. 5B, this potential blocking problem is addressed by writing a different non-zero value in the entry (slot) of the read ownership array when validating the transaction's read set as part of the commit operation. For example, in some embodiments, a reader transaction may change the value written in the appropriate entry in the read ownership array to indicate that the transaction has passed its last read set location validation and is committing. In such embodiments, element 515 of the commit operation illustrated in FIG. 5A may be replaced by the operations illustrated as 540-550 in FIG. 5B. In this example, the read set validation described above may be replaced by operations that (for each ownership record associated with memory locations in the transaction's read set): at 540, update the appropriate entry in the read ownership array to a non-zero value different than that written when read ownership is acquired (e.g., 2); at 545, execute a memory barrier operation (e.g., a MEMBAR instruction); and at 550, validate the ownership record by comparing the read-write conflict counter value to the value previously stored in the transaction's read set. In this example, element 530 of the commit operation illustrated in FIG. 5A may be modified for the example illustrated in FIG. 5B such that the transaction waits until all values in the read ownership array are not equal to this new non-zero value (e.g., 2) before releasing read and write ownerships, rather than waiting until they are all zero. Note that in some embodiments, drain functionality may be implemented to ensure progress. For example, the new writer may signal for potential readers to drain by setting a field of the ownership record to this new non-zero value, and then waiting for the readers to drain before proceeding.

In the example illustrated in FIG. 5C, the potential blocking problem described above is addressed by adding a new state, indicating that the transaction has started executing its last read set location validation, but has not yet committed. In this example, the thread may avoid changing its entries in the read ownership arrays associated with all of the locations it owns for reading, and instead may change its state (prior to validating its read set as in 515) to pre-commit-validation, as in 560. By doing so, element 530 of the commit operation illustrated in FIG. 5A may be modified for the example illustrated in FIG. 5C such that the transaction waits only for readers whose state is either the new pre-commit-validation or committed before releasing its read and write sets. Note that, in some embodiments, the change of state for a transaction may be done using a CAS-type operation, since other threads attempting to abort the transaction may also modify the state field. In other embodiments, a separate flag indicating the new state may be included, thus avoiding the need to use a CAS-type operation to set it. In such embodiments, a memory barrier operation may still need to be executed between the setting of the flag and the read set validation at 515.

Note that embodiments employing a commit operation similar to that illustrated in FIG. 5C may incur a slightly higher overhead for a writer that needs to wait for readers to finish their commit operation. However, such embodiments may include greatly reduced overhead for readers. For example, instead of executing a store and a memory barrier for each ownership record that they owned for reading, readers may only execute a single store and a memory barrier to indicate the change in state. Also, in such embodiments, transactions are likely to be able to combine the operations illustrated as 505-515 in the commit operation, and avoid iterating through their read sets when validating. This may in some embodiments reduce the (already low) overhead of this technique for supporting implicit privatization, especially in the absence of contention.

Figure 6:
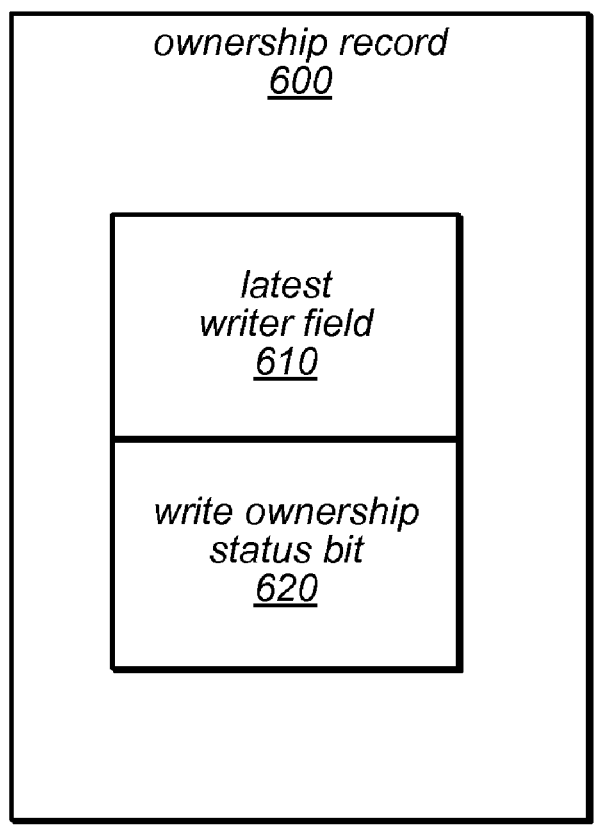
FIG. 6 is a block diagram illustrating one embodiment of an ownership record, as described herein.

As described herein, various portions of a shared memory may be associated with an ownership record and a read ownership array, which are used to manage accesses to the shared memory by concurrently executing transactions. One embodiment of an ownership record is illustrated by the block diagram in FIG. 6. In this example, ownership record 600, which may be associated with one or more locations in a shared memory, includes a write ownership status bit 620 and a latest-writer field 610. In this example, if write ownership status bit 620 is set, this indicates that the corresponding memory area is currently owned for writing by a transaction identified by the value in latest-writer field 610. When write ownership status bit 620 is not set, the associated memory area is not owned for writing, and the value of latest-writer field 610 identifies the last transaction that owned the associated memory for writing.

Figure 7:
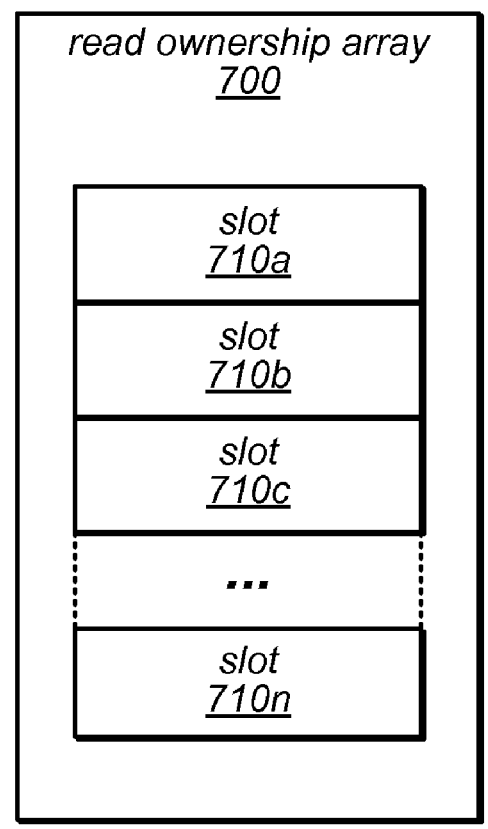
FIG. 7 is a block diagram illustrating one embodiment of a read ownership array, as described herein.

As described herein, each memory area (and thus, each ownership record) is associated with an array of entries (e.g., bytes), each indicating whether a corresponding thread owns the memory area for reading. In other words, the read ownership array records information identifying the threads executing transactions that own the associated memory area for reading. In some embodiments, all threads are "slotted", i.e., each thread in the system corresponds to a dedicated entry in each read ownership array. For example, FIG. 7 is a block diagram illustrating one embodiment of a read ownership array, as described herein. In this example, read ownership array 700 includes a plurality of slots 710a-710n, each indicating whether a corresponding thread a-n owns the associated memory area for reading. In other embodiments, described in more detail below, various mechanisms may be used to reduce the memory overhead of read ownership arrays.

As previously noted, a memory area (and/or its ownership record) is owned for writing if and only if its write ownership status bit indicates so (e.g., if it is non-zero). The memory area (and/or its ownership record) is owned for reading if and only if one or more of the entries in its read ownership array is non-zero, and the write ownership status bit does not indicate that it is owned for writing. Otherwise, the memory area and its ownership record may be considered to be free (not owned).

The system described herein may in some embodiments implement one or more of the following variations and/or optimizations.

Read-Only Transactions

In various embodiments, read-only transactions may not need to pay any overhead for privatization, such as updating of their state to pre-commit-validation, or waiting for conflicting readers to finish their commit operation, because such conflicting readers do not exist.

Smarter Contention Management

In various embodiments, the transactional memory system described herein may allow a flexible choice of contention management strategies. For example, ownership of an ownership record (or its associated memory area) may always be stolen, except that write ownership may be irrevocable during the brief period of time after a transaction has changed its state to committed and before it releases its write ownerships. Additional flexibility in the contention management strategy may be due to the system's ability to maintain the information stored in a read ownership array even while the corresponding ownership record is owned for writing.

As described herein, when a reader attempts to acquire an ownership record for reading, it may write to the appropriate entry in the read ownership array, and then check whether the ownership record is owned for writing. In some embodiments, if the ownership record is owned for writing, the reader may choose whether to undo the write of the array entry, or keep its new value. Keeping the entry's new value may in some embodiments result in the following advantages:

Reducing the overhead of re-acquiring the ownership record when the writer is done. By keeping the entry's new value, ownership is automatically passed to the reader when the writer clears the write ownership status bit. In such embodiments, the reader does not need to pay for additional store to the read ownership array, and an additional memory barrier, when the writer is done.

Providing more information for contention management. By keeping the entry's new value, other writers that consider aborting the current owner and stealing ownership of the ownership record can see that there are readers waiting for the ownership record, and take this into consideration in their decision.

On the other hand, keeping new value of the array entry while waiting may in some embodiments incur additional overhead if it causes writers to detect false read-write conflicts. In such cases, the read-write conflict counter may be unnecessarily incremented, and the change in the read-write conflict counter value may result in incurring full read set validation overhead for all running transactions.

Do Not Scan All Readers

As described herein, when a transaction acquires an ownership record for writing, it may then scan all the entries in the associated read ownership array to look for conflicting readers. In some embodiments, however, once one such conflicting reader is found, no other entries may need to be scanned. This is because regardless of how many conflicting readers are found, the read-write conflict counter will be incremented only once. In addition, in some embodiments, a transaction may decide to increment the read-write conflict counter even in the absence of conflicts, if the scanning cost becomes too high (e.g., if the number of ownership records in the write set is too high), and may avoid the scanning all together. Doing so may result in incurring an indirect cost of unnecessary full read set validation operations by all other threads, but will still yield a correct result.

Reduce or Avoid Incrementing the Read-Write Conflict Counter

Using the methods described above, every writer that steals an ownership record from readers has to increment the read-write conflict counter when committing. While this may have a relatively small direct cost, it may have an indirect cost of requiring all other transactions to execute full read set validations, even when the conflict has only happened with respect to one particular transaction. In some embodiments, the system may be configured to exploit the visibility of the readers to reduce or avoid incrementing the read-write conflict counter in cases where it is unnecessary. In other words, the system may be configured to take advantage of the fact that the writer knows the readers' identities, and to have the writer directly abort any conflicting readers rather than incrementing the read-write conflict counter. Doing so may in some embodiments reduce (or eliminate) the number of full read set validation operations that are done by other threads, but may also incur additional overhead for the writers. For example, the optimization described above, in which a writer can avoid scanning the whole read ownership array once one reader is found may no longer be valid. Instead, the writer may have to scan the entire read ownership array associated with of each of the ownership records it owns for writing, and abort all readers it encounters. In some cases, this may result in a writer unnecessarily aborting a reader that is waiting for the writer to finish while having its read ownership array entry set, as described above.

In some embodiments, the system may be configured to increment the read-write conflict counter if the number of ownership records in the write set is high, and hence the optimization described above may be worth the overhead associated with any false read-validations.

Assign Threads to Array Slots

In some embodiments, in order to reduce contention between multiple readers that are concurrently acquiring read ownership of an ownership record by each setting its respective entry in the associated read ownership array, threads may be assigned to array slots according to the cache hierarchy of the particular machine on which the transactional memory is running. In one example, the transactional memory may be implemented on a machine that is using multiple processor chips, where each chip comprises 64 hardware threads that are all sharing the same L2 cache. In this example, the size of a cache line on such a machine may be 64 bytes. In this example, the 64 hardware threads of each chip may be assigned to a sequence of read ownership array entries storing their data in bytes that reside in a single cache line. In this example, while writing any byte in this cache line invalidates the cache line for all other threads writing it, the cost is not too high because all of these threads are sharing the L2 cache.

Reduce Memory Overhead

Note that in embodiments in which the number of threads is high, the techniques described herein may involve a relatively high memory overhead, reserving #Orecs bytes for each thread, where #Orecs represents the number of ownership records allocated by the transactional memory. In some embodiments, to reduce contention between threads, the system may need to allocate more than one byte per thread on some architectures, to reduce the chance of false conflicts in the system. To reduce the memory overhead, in some embodiments, not all of the threads may be slotted (i.e. assigned an entry in the read ownership array). In such embodiments, each ownership record may include a read counter, which indicates whether any unslotted threads own the ownership record for reading. In some embodiments such a read counter may be replaced by a scalable non-zero indicator (SNZI) object to reduce the contention between readers that are trying to concurrently modify it. A SNZI object indicates only that the count of readers is non-zero, without indicating the precise number of readers or identifying them.

Note that in order to support implicit privatization (without blocking on user code), an additional counter/SNZI may be required for use as a committing indicator (CI), which indicates whether any unslotted threads have passed the last read validation of the ownership record, but have not yet finished their copy-back phase. Also note that when using this technique to manage ownership by unslotted threads, the system may pay at least 3 CAS-type operations per ownership record owned for reading: one for acquiring the ownership record, one for updating the CI when committing, and one for updating the indicators when releasing ownership and finishing the copy-back phase. Thus, performance of the system may be highest when unslotted threads are avoided, or their numbers are kept low. Other methods to reduce the memory overhead without having any unslotted threads are described below.

Lazy Allocation

While in various embodiments, the transactional memory system described herein may allocate #Orecs ownership records to reduce the number of false conflicts, in practice only a small fraction of these ownership records may be used by the transactional program. Thus, the memory overhead may in some embodiments be significantly reduced by adding a level of indirection, and only allocating the ownership record word and the read ownership array for ownership records that are actually used by the program. In such embodiments, the transactional memory system may allocate #Orecs pointers, initially all having a NULL value, and may allocate the actual ownership record word, and an associated read ownership array, only when an ownership record is first used. Note that while such an indirection may introduce a small additional cost when accessing the ownership record or the read ownership array, this overhead is only paid once per ownership record by each transaction that accesses it. Once the ownership record has been referenced by a transaction's read or write set, subsequent accesses by the transaction may in some cases be cheaper (due to cache locality, for example).

In some embodiments, this lazy allocation technique may be taken even further by dividing the read ownership array associated with each ownership record into two or more portions, such that each portion is allocated only when and if a thread that has a slot in that portion acquires the ownership record for reading. In one such embodiment, the data structures associated with a memory are may include an ownership record word and N pointers, initially all having NULL value, where N is the number of portions into which the read ownership array is divided. When a thread that has a slot in portion i needs to acquire read ownership of the ownership record, if the i-th pointer is NULL, it may allocate the i-th portion of the read ownership array and set the i-th pointer to point to it. Thus, the data structure may be thought of as a tree in which each of the read ownership array portions is a leaf in the tree. Note that the way the read ownership array is divided may depend on the architecture on which the transactional memory is implemented. For example, in some embodiments, the array may be divided such that each portion of the array corresponds to all of the threads running on a particular chip.

Storing Additional Location Identity

In some embodiments, the bytes in the read ownership array may be used to store additional information about which of the locations in shared memory mapped to a given ownership record are actually read. In some embodiments, such information may also be stored for writers, e.g., in the ownership record word. In such embodiments, a more precise read/write conflict resolution may be possible, which may reduce the number of ownership records needed in the system (by allowing more locations to be mapped to each ownership record). For example, when acquiring read ownership, a thread may be able to choose between 255 different non-zero values to write in its slot in the read ownership array. The thread may use this choice to select a value that conveys additional information about the actual location read (e.g., a location identifier). In one simple example, the thread may select a value equal to the last 8 bits of the address read, or 1 if all these bits are 0. In such embodiments, a read-write conflict only occurs when a writer that owns the ownership record accesses a location with the same location identifier as that of one of the readers. So, for example, when the writer scans the read ownership array after acquiring the ownership record for writing, it may not mark its thread-local read-write conflict flag to indicate a possible conflict unless one of the bytes in the read ownership array contains the same location identifier as that of the location being written. In such embodiments, even though a full read set validation by the threads that owned the ownership record for reading would fail, such a full read set validation may be avoided as long as the global read-write conflict counter is not incremented, and thus these readers may still be able to commit.

Note that the technique described above may only work well as long as all the read locations that map to an ownership record have the same location identifier (a special case is when only one such location is read). In some embodiments, in order to handle multiple locations, another dedicated (special) value may be put in the read ownership array slot if multiple locations that map to this ownership record, and that have different location identifiers, were read by the thread. In such embodiments, a writer may treat a conflict with such a reader as a true conflict, because not enough information about the read locations is available. Note that in another embodiment, a bit mask may be used to indicate read accesses to different regions (sets of locations) mapped to the same ownership record. In such embodiments, if accesses are made to multiple regions, more than one bit may be set. In such embodiments, writers may apply the bit mask to determine whether there is a conflict.

Non-Static Assignment of Threads to Slots

Note that embodiments of the system described herein that include both slotted and unslotted threads may introduce some level of unfairness in the system, since the slotted threads may be handled using more efficient techniques than the unslotted ones. In some embodiments, the system may be configured to change the assignment of threads to slots from time to time, handling previously unslotted threads as slotted threads, and vice verse.

In one such embodiment, the system may include a slot assigner module, which may be responsible for the allocation of slot ids to threads. In this example, if a thread is assigned a slot id i, then it uses the i-th slot in the read ownership array associated with all of the ownership records. Initially, the slot assigner module may allocate all k slot ids to k threads, and may designate the rest of the threads as unslotted. Every so often, threads may be required to return their slot ids to the slot assigner, and ask for a new one, at which point the slot assigner may make previously unslotted threads slotted, and vice verse.

One example of such a slot assigner is described below. In this example, the slot assigner maintains an array of k cells, one for each slot id. The i-th cell in the array stores the id of the thread that is currently assigned the i-th slot id, or zero of the slot id is available. In this example, to allocate a slot id for a thread, the slot assigner may scan the array for an available slot id, and if it finds one, may use a CAS-type operation to store the thread id in that cell. If the operation succeeds, the corresponding slot id may be returned to the thread, otherwise scanning continues. In this example, if no available id is found, the slot assigner may notify the thread that it is unslotted. In this example, to release a slot id, the slot assigner may simply store zero in the appropriate cell in the array. Note that while the assignment of slot ids may be relatively expensive, it may only need to be done every once in a while, depending on the fairness guarantees required by the system.

Figure 8:
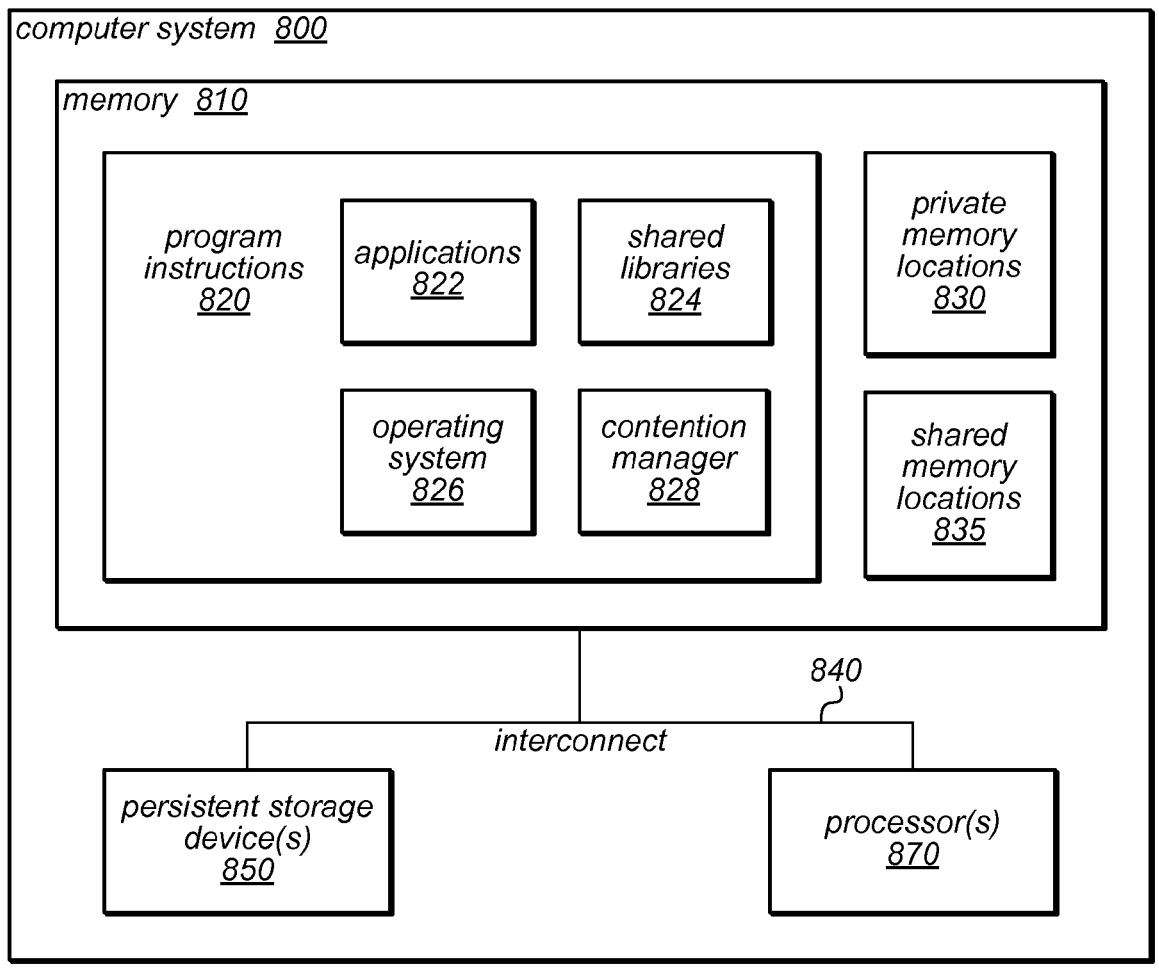
FIG. 8 is a block diagram illustrating an exemplary computer system configured to implement a transactional memory, according to various embodiments.

FIG. 8 illustrates a computing system configured to implement the methods described herein, according to various embodiments. The computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for providing transactional memory described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 800 may include one or more processors 870, each may include multiple cores, any of which may be single or multi-threaded. The computer system 800 may also include one or more persistent storage devices 850 (e.g. optical storage, magnetic storage, hard drive, tape drive, solid state memory, etc) and one or more memories 810 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 8 (e.g., video cards, audio cards, additional network interfaces, peripheral devices, a network interface such as an ATM interface, an Ethernet interface, a Frame Relay interface, etc.)

The one or more processors 870, the storage device(s) 850, and the system memory 810 may be coupled to the system interconnect 840. One or more of the system memories 810 may contain program instructions 820. Program instructions 820 may be executable to implement one or more applications 822, shared libraries 824, operating systems 826, or contention managers 828, as described herein. Program instructions 820 may be encoded in platform native binary, any interpreted language such as Java™ byte-code, or in any other language such as C/C++, Java™, etc or in any combination thereof. The program instructions 820 may include transactional memory support configured to provide functions, operations and/or other processes for implementing a scalable transactional memory that features revocable read ownership, and write ownership that is revocable except during a transaction commit operation, as described herein. Such support and functions may exist in one or more of the shared libraries 824, operating systems 826, contention managers 828, or applications 822, in various embodiments. The system memory may further comprise private memory locations 830 and/or shared memory locations 835 where data may be stored. For example, these locations may store data in one or more ownership records, one or more read ownership arrays, one or more thread-local read-write conflict indicators, a global read-write conflict counter, and/or other data structures accessible to a plurality of concurrently executing threads, processes, or transactions, in various embodiments.

Although the embodiments above have been described in considerable detail, numerous variations and modifications will become apparent to those skilled in the art once the above disclosure is fully appreciated. For example, although many of the embodiments are described in terms of a hybrid transactional memory system, it should be noted that the techniques and mechanisms disclosed herein may be applicable in other contexts in which transactions are used, including software transactional memory and/or hardware transactional memory. It is intended that the following claims be interpreted to embrace all such variations and modifications.

What is claimed:

1. A method, comprising:
 performing, by a computer:
  associating a first thread with a portion of a read ownership data structure, wherein the read ownership data structure stores data indicating which, if any, threads currently own a location in a shared memory for reading;
  the first thread executing program instructions comprising user code to be completed as a first atomic transaction, wherein the user code comprises one or more memory access operations to the shared memory, wherein for a given read memory access operation of the first atomic transaction that targets the location in the shared memory, said executing comprises:
   attempting to acquire read ownership of the location in the shared memory; and
   performing the read memory access operation; and
  a second thread executing program instructions comprising user code to be completed as a second atomic transaction concurrently with said executing program instructions comprising user code to be completed as a first atomic transaction, wherein for a given write memory access operation of the second atomic transaction that targets the location in the shared memory, said executing comprises:
   attempting to acquire write ownership of the location in the shared memory; and
   performing the write memory access operation;
  wherein said attempting to acquire read ownership of the location comprises writing a value indicating that the location is owned for reading in the portion of the read ownership data structure associated with the first thread using an ordinary store-type operation;
  wherein successfully acquiring write ownership comprises storing a value in an ownership record associated with the location indicating that the location is owned for writing; and
  wherein successfully acquiring write ownership of the location results in revoking the read ownership of the location.

2. The method of claim 1, wherein said attempting to acquire read ownership further comprises:
 determining whether another transaction owns the location for writing; and
 in response to determining that no other transaction owns the location for writing, recording an identifier of a latest transaction to own the location for writing in a read set associated with the first atomic transaction; and
 wherein said writing a value indicating that the location is owned for reading is performed in response to determining that no other transaction owns the location for writing.

3. The method of claim 1, wherein said successfully acquiring write ownership of the location does not result in modifying the value indicating that the location is owned for reading in the portion of the read ownership data structure associated with the first thread.

4. The method of claim 1,
 wherein said storing a value in an ownership record comprises storing a value in a write ownership status indicator of the ownership record; and
 wherein said successfully acquiring write ownership further comprises storing an identifier of the second atomic transaction in a latest writer field of the ownership record.

5. The method of claim 4, where said successfully acquiring write ownership further comprises:
 determining whether any other transactions own the location for reading; and
 in response to determining that one or more other transactions owns the location for reading, setting a local read-write conflict indicator to indicate a potential read-write conflict.

6. The method of claim 5, further comprising:
 prior to said executing program instructions comprising user code to be completed as a first atomic transaction, the first thread recording a value of a global read-write conflict counter; and
 subsequent to said executing program instructions comprising user code to be completed as a first atomic transaction, the first thread:
  attempting to commit the first atomic transaction, wherein attempting to commit the first atomic transaction comprises:
   determining whether a local read-write conflict indicator is set;
   in response to determining that the local read-write conflict indicator is set, modifying the global read-write conflict counter;
   determining if a current value of the global read-write conflict counter matches the recorded value of the global read-write conflict counter; and avoiding performing a full read set validation for the transaction if the current value matches the recorded value.

7. The method of claim 1, wherein said attempting to acquire write ownership of the location in the shared memory comprises:
   determining whether another transaction owns the location for writing;
   in response to determining that another transaction owns the location for writing, determining whether the other transaction is in a commit state in which it has validated its read set, but has not yet committed its results; and
   in response to determining that the other transaction is not in a commit state, successfully acquiring ownership of the transaction.

8. A system comprising:
   one or more processors; and
   a memory coupled to the one or more processors and storing program instructions executable by one or more processors to implement:
      associating a first thread with a portion of a read ownership data structure, wherein the read ownership data structure stores data indicating which, if any, threads currently own a location in a shared memory for reading;
      the first thread executing user code to be completed as a first atomic transaction, wherein the user code comprises one or more memory access operations to the shared memory, wherein for a given read memory access operation of the first atomic transaction that targets the location in the shared memory, said executing comprises:
         attempting to acquire read ownership of the location in the shared memory; and
         performing the read memory access operation; and
      a second thread executing user code to be completed as a second atomic transaction concurrently with said executing user code to be completed as a first atomic transaction, wherein for a given write memory access operation of the second atomic transaction that targets the location in the shared memory, said executing comprises:
         attempting to acquire write ownership of the location in the shared memory; and
         performing the write memory access operation;
      wherein said attempting to acquire read ownership of the location comprises writing a value indicating that the location is owned for reading in the portion of the read ownership data structure associated with the first thread using an ordinary store-type operation;
      wherein successfully acquiring write ownership comprises storing a value in an ownership record associated with the location indicating that the location is owned for writing; and
      wherein successfully acquiring write ownership of the location results in revoking the read ownership of the location.

9. The system of claim 8, wherein said attempting to acquire read ownership further comprises:
   determining whether another transaction owns the location for writing; and
      in response to determining that no other transaction owns the location for writing, recording an identifier of a latest transaction to own the location for writing in a read set associated with the first atomic transaction; and
   wherein said writing a value indicating that the location is owned for reading is performed in response to determining that no other transaction owns the location for writing.

10. The system of claim 8, wherein said successfully acquiring write ownership of the location does not result in modifying the value indicating that the location is owned for reading in the portion of the read ownership data structure associated with the first thread.

11. The system of claim 8,
    wherein said storing a value in an ownership record comprises storing a value in a write ownership status indicator of the ownership record; and
    wherein said successfully acquiring write ownership further comprises storing an identifier of the second atomic transaction in a latest writer field of the ownership record.

12. The system of claim 11, where said successfully acquiring write ownership further comprises:
    determining whether any other transactions own the location for reading; and
    in response to determining that one or more other transactions owns the location for reading, setting a local read-write conflict indicator to indicate a potential read-write conflict.

13. The system of claim 12, wherein the program instructions are further executable by one or more processors to implement:
    prior to said executing user code to be completed as a first atomic transaction, the first thread recording a value of a global read-write conflict counter; and
    subsequent to said executing user code to be completed as a first atomic transaction, the first thread:
        attempting to commit the first atomic transaction, wherein attempting to commit the first atomic transaction comprises:
            determining whether a local read-write conflict indicator is set;
            in response to determining that the local read-write conflict indicator is set, modifying the global read-write conflict counter;
            determining if a current value of the global read-write conflict counter matches the recorded value of the global read-write conflict counter; and
            avoiding performing a full read set validation for the transaction if the current value matches the recorded value.

14. The system of claim 8, wherein said attempting to acquire write ownership of the location in the shared memory comprises:
    determining whether another transaction owns the location for writing;
    in response to determining that another transaction owns the location for writing, determining whether the other transaction is in a commit state in which it has validated its read set, but has not yet committed its results; and
    in response to determining that the other transaction is not in a commit state, successfully acquiring ownership of the transaction.

15. A computer readable storage medium storing program instructions computer-executable to implement:
    associating a first thread with a portion of a read ownership data structure, wherein the read ownership data structure stores data indicating which, if any, threads currently own a location in a shared memory for reading;
    the first thread executing user code to be completed as a first atomic transaction, wherein the user code comprises one or more memory access operations to the shared memory, wherein for a given read memory access operation of the first atomic transaction that targets the location in the shared memory, said executing comprises:
  attempting to acquire read ownership of the location in the shared memory; and
  performing the read memory access operation; and
the second thread executing user code to be completed as a second atomic transaction concurrently with said executing user code to be completed as a first atomic transaction, wherein for a given write memory access operation of the second atomic transaction that targets the location in the shared memory, said executing comprises:
  attempting to acquire write ownership of the location in the shared memory; and
  performing the write memory access operation;
wherein said attempting to acquire read ownership of the location comprises writing a value indicating that the location is owned for reading in the portion of the read ownership data structure associated with the first thread using an ordinary store-type operation;
wherein successfully acquiring write ownership comprises storing a value in an ownership record associated with the location indicating that the location is owned for writing; and
wherein successfully acquiring write ownership of the location results in revoking the read ownership of the location.

16. The storage medium of claim 15, wherein said attempting to acquire read ownership further comprises:
  determining whether another transaction owns the location for writing; and
    in response to determining that no other transaction owns the location for writing, recording an identifier of a latest transaction to own the location for writing in a read set associated with the first atomic transaction; and
  wherein said writing a value indicating that the location is owned for reading is performed in response to determining that no other transaction owns the location for writing.

17. The storage medium of claim 15, wherein said successfully acquiring write ownership of the location does not result in modifying the value indicating that the location is owned for reading in the portion of the read ownership data structure associated with the first thread.

18. The storage medium of claim 15,
  wherein said storing a value in an ownership record comprises storing a value in a write ownership status indicator of the ownership record; and
  wherein said successfully acquiring write ownership further comprises storing an identifier of the second atomic transaction in a latest writer field of the ownership record.

19. The storage medium of claim 18, where said successfully acquiring write ownership further comprises:
  determining whether any other transactions own the location for reading; and
  in response to determining that one or more other transactions owns the location for reading, setting a local read-write conflict indicator to indicate a potential read-write conflict.

20. The storage medium of claim 15, wherein said attempting to acquire write ownership of the location in the shared memory comprises:
  determining whether another transaction owns the location for writing;
  in response to determining that another transaction owns the location for writing, determining whether the other transaction is in a commit state in which it has validated its read set, but has not yet committed its results; and
  in response to determining that the other transaction is not in a commit state, successfully acquiring ownership of the transaction.

* * * * *